(12) United States Patent
Kazdaghli

(10) Patent No.: US 11,816,879 B2
(45) Date of Patent: Nov. 14, 2023

(54) BIAS EVALUATION OF A BIOMETRIC IDENTIFICATION FUNCTION

(71) Applicant: IDEMIA IDENTITY & SECURITY FRANCE, Courbevoie (FR)

(72) Inventor: Laurent Kazdaghli, Courbevoie (FR)

(73) Assignee: Idemia Identity & Security France, Courbevoie (FR)

( * ) Notice: Subject to any disclaimer, the term of this patent is extended or adjusted under 35 U.S.C. 154(b) by 212 days.

(21) Appl. No.: 17/304,914

(22) Filed: Jun. 28, 2021

(65) Prior Publication Data

US 2022/0004800 A1    Jan. 6, 2022

(30) Foreign Application Priority Data

Jul. 1, 2020   (FR) ...................................... 2006953

(51) Int. Cl.
*G06V 40/10*      (2022.01)
*G06V 10/75*      (2022.01)
(Continued)

(52) U.S. Cl.
CPC ...... *G06V 10/751* (2022.01); *G06F 16/90335* (2019.01); *G06N 3/08* (2013.01); *G06V 40/10* (2022.01)

(58) Field of Classification Search
CPC .... G06V 10/751; G06V 40/10; G06V 40/197; G06N 3/08; G06F 16/90335
See application file for complete search history.

(56) References Cited

U.S. PATENT DOCUMENTS

2017/0236017 A1* 8/2017 Neumann ............ G06V 10/993
                                                        382/115
2022/0004800 A1* 1/2022 Kazdaghli ......... G06F 16/90335

FOREIGN PATENT DOCUMENTS

CA         3044063 A1 *  6/2018  ......... G06K 9/00006
WO   WO-2013181695 A1 * 12/2013  ............. G06F 21/32

OTHER PUBLICATIONS

Poh, Norman, and Josef Kittler. "A biometric menagerie index for characterising template/model-specific variation." Advances in Biometrics: Third International Conference, ICB , Jun. 2-5, 2009. Springer (Year: 2009).*

(Continued)

*Primary Examiner* — Shaghayegh Azima
(74) *Attorney, Agent, or Firm* — WOMBLE BOND DICKINSON (US) LLP

(57) ABSTRACT

An evaluation method of a biometric identification function implemented from a candidate biometric data set and a reference biometric data set, the biometric identification function, applied to a candidate biometric data item and a reference biometric data item, returning a match, the method comprising steps of:
  obtaining pairs of false matches, each pair comprising a candidate biometric data item and a reference biometric data item not associated with a same known individual;
  determining, for each candidate biometric data item in a pair, a first number associated with said item and equal to the number of pairs of false matches obtained comprising said item, and/or a second number associated with said reference biometric data item and equal to the number of pairs of false matches obtained comprising said item;
  calculating a bias score based on a maximum of the first numbers and/or based on a maximum of the second numbers.

13 Claims, 6 Drawing Sheets

(51) Int. Cl.
G06F 16/903 (2019.01)
G06N 3/08 (2023.01)

(56) References Cited

OTHER PUBLICATIONS

Poh, Norman, and Josef Kittler. "A biometric menagerie index for characterising template/model-specific variation." Advances in Biometrics: Third International Conference, ICB; Springer, 2009. (Year: 2009).*

Preliminary Research Report received for French Application No. 2006953, dated Feb. 22, 2021, 5 pages (1 page of French Translation Cover Sheet and 4 pages of original document).

Poh Norman et al: "A Biometric Menagerie Index for Characterising Template/Model-Specific Variation", Jun. 2, 2009 (Jun. 2, 2009), Big Data Analytics in the Social and Ubiquitous Context : 5th International Workshop on Modeling Social Media, MSM 2014, 5th International Workshop on Mining Ubiquitous and Social Environments, MUSE 2014 and First International Workshop on Machine LE, XP047468486, ISBN: 978-3-642-17318-9 p. 1-p. 5.

Cabana Antoine et al: "Mono and multi-modal biometric systems assessment by a common black box testing framework", Future Generation Computer Systems, Elsevier Science Publishers. Amsterdam, NL, vol. 101, Jun. 13, 2019 (Jun. 13, 2019), pp. 293-303, XP085914775, ISSN: 0167-739X, DOI:10.1016/J.Future.2019.04. 053 [extrait le Jun. 13, 2019] pp. 4, 5, 8-10.

Drozdowski Pawel et al: in Biometrics: A Survey on an Emerging Demographic Bias Challenge11 , IEEE Transactions on Technology and Society, IEEE, vol. 1, No. 2, May 5, 2020 (May 5, 2020), pp. 89-103, XP011791675, DOI: 10.1109/TTS.2020.2992344 [extrait le Jun. 3, 2020 pp. 1-pp. 7.

* cited by examiner

| T | 1500.00 | 2000.00 | 2500.00 | 3000.00 | 3500.00 | 4000.00 | 4500.00 | 5000.00 |
|---|---|---|---|---|---|---|---|---|
| TP UL 1 | 18.86 | 2.67 | 0.86 | 0.49 | 0.37 | 0.35 | 0.33 | 0.19 |
| TP UL 2 | 107.46 | 9.61 | 1.19 | 0.37 | 0.35 | 0.33 | 0.19 | 0.17 |
| TP UL 3 | 185.89 | 15.77 | 1.42 | 0.31 | 0.29 | 0.26 | 0.18 | 0.16 |
| σ | 83.56 | 6.55 | 0.28 | 0.09 | 0.04 | 0.05 | 0.08 | 0.01 |

BIAS EVALUATION OF A BIOMETRIC IDENTIFICATION FUNCTION

CROSS-REFERENCE TO RELATED APPLICATIONS

This application claims priority pursuant to 35 U.S.C. 119(a) to France Patent Application No. 2006953, filed Jul. 1, 2020, which application is incorporated herein by reference in its entirety.

TECHNICAL FIELD OF THE INVENTION

The present invention relates to the field of biometric identification. The invention finds in particular an advantageous application for the improvement of biometric identification algorithms allowing matching an acquired candidate biometric data item with unidentified "latent" biometric data, for example latent data coming from a police UL database.

STATE OF THE ART

Biometrics is widely used for identity determination or verification. Biometric identification techniques make use, for example, of images or sounds acquired from an individual, such as fingerprint images, face images, or voice extracts, from which standardized features are extracted.

In the case of fingerprint recognition, numerous techniques are known for extracting particular fingerprint points, called "minutiae", from fingertip images. The minutiae mark, for example, the bifurcations in the lines of the print, or the ends of the ridges in a map of ridges of the print. A set of minutiae is considered characteristic of a given individual's fingerprints.

A biometric identification function can, for example, evaluate a match between, on the one hand, the minutiae of an acquired candidate print and, on the other hand, the minutiae of each print among a set of prints stored in a database. It is particularly appropriate to develop biometric identification functions from neural networks selected for their good performance in image analysis, for example, convolutional neural networks (or "CNNs") trained by machine learning.

Biometric identification is used in forensics to determine the identity of a suspect who has, for example, left fingerprints on an object present at a crime scene. Many prints left at a crime scene are so-called "latent" prints, which do not benefit from optimal conditions for extracting minutiae, and which are in particular not visible to the naked eye. The pattern of a latent print is, for example, blurred and/or does not detach sufficiently from the background of the surface of the object. Police forces have development techniques to highlight and record the pattern of a latent print.

Over time, police forces are able to build databases of previously acquired "latent" prints, for example, found at crime scenes, with which an individual's identity has not been associated. Such a database can be described as a "UL database" (for Unidentified Latent prints, where the prints collected in such a database are unidentified latent prints).

The principle of identification is as follows: when a new print is acquired, said print can be compared in an automated manner with each unidentified latent print present in a UL database, using a biometric identification function. If the acquired new print has a sufficient match score with one or more latent prints of the UL database, then said latent prints are considered potential candidates.

In particular, the new candidate print may have been acquired in a controlled manner, for example on a suspect, using a biometric sensor. Alternatively, the new candidate print is also a crime scene print.

In order to complete the determination of whether one or more prints of the UL database belong to the same individual as the new print acquired, a human examiner can take over and carry out a thorough examination, in particular a visual examination. It will be understood that the prior step of automated computer-based comparison with respect to each latent print of the UL database is indispensable, since it is not feasible for a human examiner to carry out a careful and thorough examination with respect to each print of the UL database—the latter possibly containing several millions of unidentified latent prints. It is desired to design identification functions for which the number of potential candidates to be forwarded to the human examiner remains moderate.

A first problem observed for biometric identification with respect to a UL database is the insufficient performance of certain biometric identification functions, from the point of view of the number of false rejections (match score between two prints lower than the validation threshold in spite of the fact that the two prints come from the same individual) as well as from the point of view of the number of false acceptances (match score higher than or equal to the validation threshold, in spite of the fact that the two prints come from different individuals).

To overcome this problem, it is known to optimize biometric identification functions, in particular in the case of CNN networks. The parameters of a CNN may be individually optimized to minimize false rejections and/or acceptances obtained from one or more training databases. It is also possible to merge CNNs.

A second problem observed for biometric identification with respect to a UL database is the strong propensity of certain biometric identification functions to return false acceptances involving the same print, or involving, more generally, the same type of prints. In this case, the same acquired print and/or the same latent print of the UL database are frequently associated with an erroneous positive match result, and are therefore frequently forwarded to the human examiner for further examination. The identification function is therefore biased.

This situation may in particular occur in the event of over-learning during the CNN training phase, and/or in the event of a misrepresentation of one or more groups of individuals in the training database(s). Learning for CNNs from latent prints can be difficult, as latent prints of the same identity may rotate or obscure relative to each other. In addition, minutiae can be erroneously detected in the background.

The identification bias mentioned above, referred to as "Doddington risk", must imperatively be minimized because the frequent forwarding of the same print can lead to rapid fatigue. The human examiner may, in practice, carry out less thorough examinations with regard to the said print. There is also the risk that potential candidates proposed by the IT tool will be considered unreliable.

The state of the art in the field of biometric identification is therefore unsatisfactory with regard to the evaluation of the "Doddington risk". Thus, biometric identification functions that are very effective in terms of the number of false rejections and false acceptances may prove to be of little use in practice, since the bias associated with the Doddington risk has not been duly taken into account during their development.

SUMMARY

An object of the invention is to develop enhanced biometric identification functions, the bias of which with respect to the "Doddington risk" is minimized in a simple and rapid manner.

In particular, a method is sought for evaluating a bias of a biometric identification function allowing to quantify to what extent said function frequently returns false acceptances involving the same candidate print or involving the same reference print.

One aim is to develop biometric identification algorithms that are not only reliable and effective from the point of view of minimizing false rejections and false acceptances, but also that have little bias to prevent a human examiner—for example a member of the police force—from being asked to carry out too many thorough examinations with respect to the same latent print. The aim is, therefore, to make biometric identification more reliable and practical for police forces.

To meet these needs, according to a first aspect of the invention, an evaluation method of a biometric identification function is provided, the evaluation method being implemented from a candidate biometric data set and from a reference biometric data set, the candidate biometric data and the reference biometric data being of the same type and each being associated with a known individual, the biometric identification function, applied to a candidate biometric data item and a reference biometric data item, returning a matching result from said two data items, the method comprising the steps of: obtaining pairs of false matches, each pair comprising a candidate biometric data item and a reference biometric data item not associated with a same known individual, and whose match result is greater than or equal to a predetermined threshold, determining, for each candidate biometric data comprised in at least one pair of false matches, a first number associated with said candidate biometric data and equal to the number of pairs of false matches obtained comprising said candidate biometric data, and/or determining, for each reference biometric data comprised in at least one pair of false matches, a second number associated with said reference biometric data and equal to the number of pairs of false matches obtained comprising said reference biometric data, calculating a bias score associated with the biometric identification function, the bias score being calculated based on a maximum of the first numbers determined from the pairs of false matches and/or based on a maximum of the second numbers determined from the pairs of false matches.

The above defined evaluation method may further have the following optional and non-limiting characteristics, taken alone or in any one of the technically possible combinations:

the bias score is equal to one of:
the maximum of the first numbers associated with a candidate biometric data item;
or the maximum of the second numbers associated with a reference biometric data item;
or a sum of the maximum of the first numbers associated with a candidate biometric data item affected by a first coefficient and by the maximum of the second numbers associated with a reference biometric data item affected by a second coefficient.

the reference biometric data set is derived from a training latent print database.
the candidate biometric data set comprises a plurality of candidate biometric data associated each with a known individual present in the training latent print database, and further comprises a plurality of candidate biometric data associated each with a known individual absent from the training latent print database.

the candidate biometric data and the reference biometric data are derived from fingerprints, or are derived from iris images, or are derived from face images, or are derived from extracts from the voices of individuals.

by naming matching queries the pairs comprising a candidate biometric data item and a reference biometric data item whose matching result provided by the biometric function is greater than or equal to the predetermined threshold, the predetermined threshold for the matching result is selected so that a ratio between the total number of pairs of false matches and the total number of matching queries is equal to a predetermined false acceptance rate.

the rate of false acceptances is greater than 0.50%, more preferably greater than 1.0% and less than 20%, even more preferably equal to 10%.

the method comprises a step of determining a performance score associated with the biometric identification function.

the performance score depends on a false rejection rate of the biometric identification function and on the false acceptance rate.

the method comprises a step of evaluating the bias score with respect to a bias threshold, the biometric identification function being evaluated as having sufficient little bias if the bias score is less than or equal to the bias threshold.

the method comprises an additional step of comparing the bias score obtained for the biometric identification function with an additional bias score obtained for an additional biometric identification function.

the method comprises an additional step of obtaining an enhanced biometric identification function, from the biometric identification function, such that an enhanced bias score obtained for the enhanced biometric identification function is strictly lower than the bias score obtained for the biometric identification function.

The invention also relates to a data processing method comprising an evaluation method as defined above, wherein an enhanced biometric identification function is obtained as a result of the evaluation method, the data processing method further comprising an identification of at least one unidentified biometric data item on the basis of the enhanced biometric identification function and on the basis of the unidentified biometric data item, comprising the steps of:

obtaining a candidate biometric data item, the candidate biometric data item being of the same type as the unidentified biometric data item, calculating at least one match result between the obtained candidate biometric data item and the unidentified biometric data item, if the match result is greater than or equal to a threshold, associating the unidentified biometric data item with an identity matching with the candidate biometric data item.

According to a second aspect, the invention relates to a system for biometric identification of an individual, comprising a processing unit configured to implement a data processing method as defined above, from the candidate biometric data item acquired and from a set of unidentified biometric data, and a biometric sensor configured to acquire a candidate biometric data item.

According to a third aspect, the invention relates to a computer program product on which code instructions are stored, which, when said instructions are executed by a computer, cause the computer to execute an evaluation method as defined above, or to execute a data processing method as defined above.

According to a fourth aspect, the invention relates to computer-readable storage means, on which code instructions are stored for implementing an evaluation method as defined above, or for implementing a data processing method as defined above.

BRIEF DESCRIPTION OF THE DRAWINGS

Other characteristics, purposes and advantages of the invention will become clear from the following description, which is purely illustrative and non-limiting, and which must be read in the context of the attached drawings in which.

DETAILED DESCRIPTION

Figure 1:
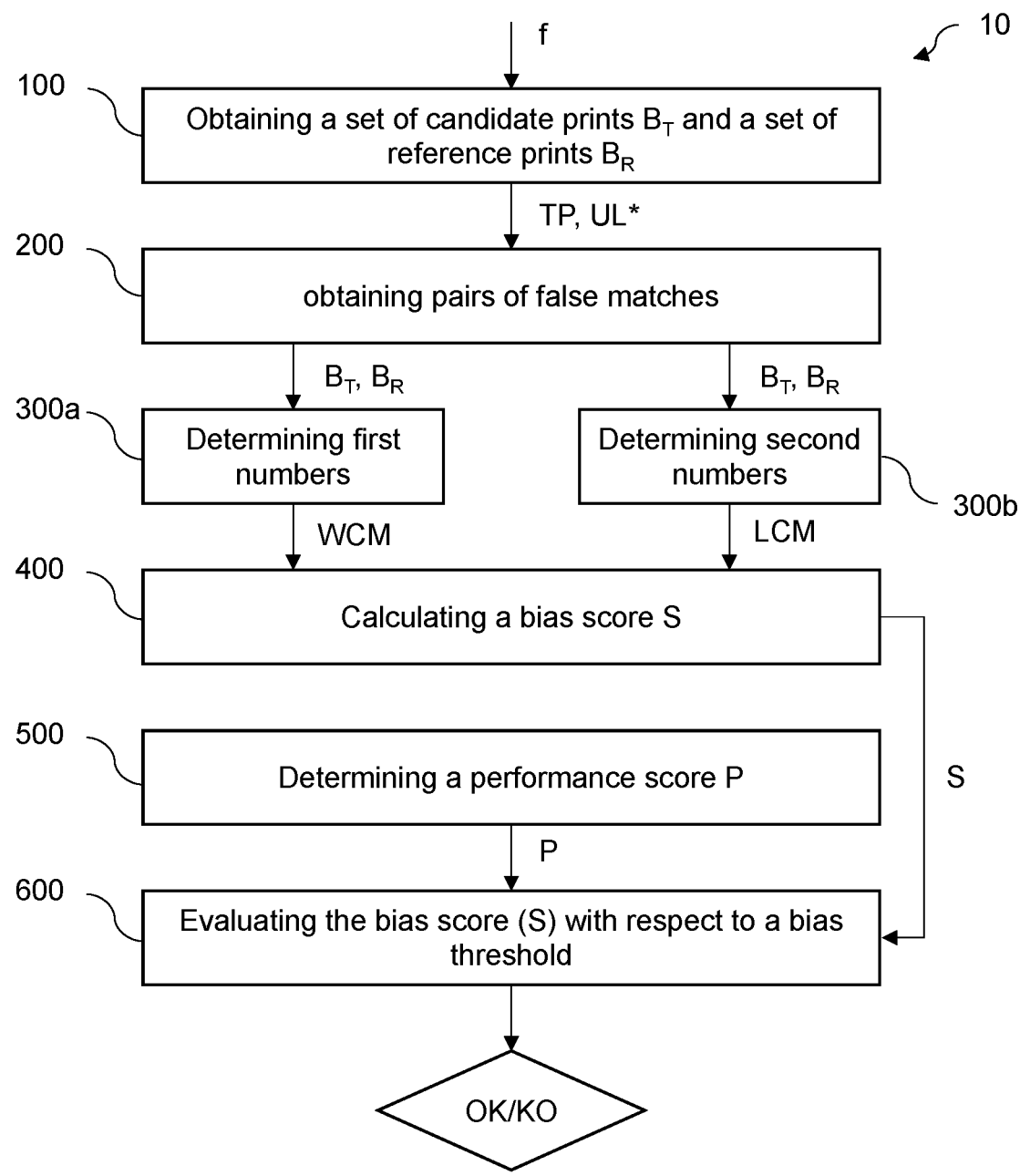
FIG. 1 shows steps of a method for evaluating the bias of a biometric identification function, according to an exemplary embodiment.

In the detailed description below and in the appended figures, the example of an evaluation of the bias associated with the "Doddington risk" for a biometric identification function f taking as input a candidate print of the TP type and a latent print from a UL database is described. The function f outputs a match result R between said two prints, this result R being able to be compared with a validation threshold T associated with the function f in order to determine whether said two prints belong to a same individual.

Hereinafter, the term "positive" result will be used if the two prints are considered to belong to the same individual (result R greater than or equal to threshold T).

The term "negative" result will be used if the two prints are considered not to belong to the same individual (result R below threshold T).

However, it will be understood that the invention applies with the same advantages for biometric identification functions that would exploit other types of biometric trait. The steps described below for bias evaluation—and, where appropriate, for performance evaluation and for biometric identification—advantageously apply to any type of biometric trait and in particular to iris images, face images, or extracts from the voices of individuals.

The bias associated with the "Doddington risk" quantifies a propensity of the biometric identification function f to return false acceptances involving a same biometric data item, here a same print. By way of illustration, there are two cases:

A biased function frequently returns a positive result between, on the one hand, a same candidate print and, on the other hand, a plurality of different reference prints.

In the Doddington classification, said candidate print can be qualified as "wolf." This is a print that can successfully identify several different individuals registered in a database;

A biased function frequently returns a positive result between, on the one hand, a plurality of different candidate prints and, on the other hand, a same reference print.

In the Doddington classification, said reference print can be qualified as "lamb." This is a print against which several different individuals can successfully identify.

A general definition of the Doddington risks, and a description of the "wolf" and "lamb" categories as well as other categories of the Doddington classification, are given in the following publication: *Analysis of Doddington Zoo Classification for User Dependent Template Update: Application to Keystroke Dynamics Recognition*, Abir Mhenni, Estelle Cherrier, Christophe Rosenberger, Najoua Essoukri Ben Amara, Future Generation Computer Systems, Elsevier, 2019.

In all of the appended figures and throughout the description below, similar features have identical alphanumeric references.

Candidate Prints and Reference Prints

Hereinafter, the evaluation of the bias of the function f is carried out from a candidate biometric database TP and from a reference biometric UL* database. The candidate data and the reference data here are prints.

"Print" is understood to be a trace and, generally, any structured content made up of ridges and valleys (generally binary, that is in black and white), which may be overprinted on the background, and in particular a biometric print uniquely associated with an individual. The print is advantageously chosen from a fingerprint, a palmar print, a retinal print, etc.

Hereinafter, fingerprints are considered.

"Candidate data" is understood here to mean a data item intended to be acquired in a controlled and voluntary manner, for example, using a biometric sensor. The candidate data item can thus serve as a basis for biometric identification.

Advantageously, the candidate prints $B_T$ from the database TP are "direct" prints benefiting from a high level of visibility, for example "Ten Print" images obtained from a ten finger biometric scanner. The candidate prints $B_T$ are typically of good quality, and well isolated. The candidate prints $B_T$ are for example on a white background.

"Reference data" is understood here to mean a data item intended to be stored in a database before a biometric identification, for subsequent comparison with an acquired candidate data item.

Advantageously, during the evaluation of the bias of the function f, the reference prints $B_R$ of the UL* database are prints of the "latent" type, that is to say images representative of a print over a background whose visibility is low, as opposed to Ten Print images which are "direct" prints.

"Background" is understood to mean a textured background on which a print can be superimposed, for example a piece of furniture, a banknote, a weapon, a paper, tableware, etc. There may be confusion between patterns of the print and patterns of the background, which explains why the visibility of the latent print is low.

The concept of background is opposed to the concept of a plain ground. Although it can be considered that a direct print is overprinted on a white background, it will be understood that the direct print detaches without difficulty from this background and can be isolated by segmentation, which is very difficult or impossible for a latent print.

The reference prints $B_R$ of the UL* database used for the bias evaluation, as well as the candidate prints $B_T$ of the database TP used for the bias evaluation, are each associated with an identity of an individual. The reference prints $B_R$ and the candidate prints $B_T$ can respectively be qualified as training reference prints and training candidate prints. These prints preferably reproduce the same properties as the prints in real use: low visibility for the reference prints $B_R$ and high visibility for the candidate prints $B_T$.

Very advantageously, the database TP of candidate prints comprises a plurality of candidate prints each associated with a known individual present in the UL* database (individual present in the database is understood to mean that a reference print of the UL* database is extracted from said individual), and further comprises a plurality of candidate prints each associated with a known individual absent from the UL* database (that is no reference print of the UL* database is extracted from this latter individual).

Conversely, in a real case of use of the function f, the reference prints are preferably prints (hereinafter denoted $B_{UL}$) not associated with an identity of an individual, that is to say, not labelled. These are typically latent prints.

As will be seen below, in practice, these are often prints from a UL database created, for example, by the police forces.

It should be noted that it is not necessary for the reference biometric database, used for the bias evaluation, to only comprise "latent" biometric data. To perform the evaluation of the bias of the function f, it suffices to have available pairs of false matches obtained with the aid of the function f between a candidate biometric data item and a reference biometric data item.

Method for Evaluating a Biometric Identification Function

FIG. 1 shows steps of a method 10 for evaluating the bias of a biometric identification function f, according to one example. The method 10 is implemented from a biometric identification function f.

The function f allows comparing a candidate print acquired with each latent print among a plurality of reference latent prints present in a database, typically a UL database. A result of the function f applied to two print images is, for example, a match result R between data extracted from the two print images. The extracted data compared are typically binarized images of "ridge maps" of the two prints.

In the following, the function f is associated with a validation threshold T.

It is sought to evaluate the propensity of the function f to obtain erroneous successful biometric identifications (that is false acceptances) for the same candidate print ("wolf" in the Doddington classification), or for the same reference print ("lamb" in the Doddington classification).

One object is to develop biometric identification functions with not only a limited rate of false acceptances, but for which false acceptances are statistically better distributed among individuals. It is sought to prevent a particular print or type of print from often being the object of erroneous successful biometric identification. It is thus sought to minimize the operator time and cost associated with extensive human examinations, leading to a negative final result for identification.

The evaluation of the bias of the function f is thus optionally followed by the selection or generation of a biometric identification function having a lesser bias with respect to the "Doddington risk".

For example, during the evaluation or at the outcome of the evaluation, the bias obtained for the function f is compared with a bias obtained for a second biometric identification function f', in order to select the least biased of the two functions, and/or an enhanced biometric identification function f* is validated, as will be seen below.

The evaluation method 10 is implemented by a processing unit, typically a processor in which a code associated with the function f is stored in memory.

The bias score associated with the function f is determined from a set of pairs of false matches, where each pair comprises a candidate print $B_T$ and a reference print $B_R$ that are not associated with the same known individual, and whose match result R is positive.

Optionally, in a step 100, a set of candidate prints $B_T$ and a set of reference prints $B_R$ are obtained, for example from remote databases. The candidate prints $B_T$ and the reference prints $B_R$ are, for example, derived from training databases.

Preferably, the number of reference prints $B_R$ used for the bias evaluation is greater than 10,000, more preferably greater than 10,000, and is typically between 100,000 and 1,000,000.

Preferably, the number of candidate prints $B_T$ used for the bias evaluation is greater than 10,000, more preferably greater than 50,000, and is typically between 50,000 and 1,000,000.

It should be recalled that, preferably, the candidate prints $B_T$ used for the bias evaluation are prints benefiting from good visibility (preferably TP prints) associated with an identified individual, and that preferably, the reference prints $B_R$ used for the bias evaluation are latent prints derived from a UL* database associated with an identified individual.

In a step 200, a set of pairs of false matches ($B_T$, $B_R$) is obtained between candidate prints and reference prints.

To do this, the function f can be applied to a large number of candidate print/reference print pairs, among the prints obtained in step 100.

Among the pairs providing a positive match result R (which will hereinafter be referred to as "matching queries"), that is, providing a result R greater than or equal to the threshold T, certain pairs collect a candidate print and a reference print, which actually belong to the same individual.

Other queries correspond to "pairs of false matches" ($B_T$, $B_R$) gathering a candidate print $B_T$ and a reference print $B_R$, which are not associated with the same individual. It is these pairs of mismatches that are used to evaluate the "Doddington risk"-related bias.

Alternatively, a pre-formed set of matching queries and/or a pre-formed set of false match pairs may be previously stored in memory, or obtained in step 200 from a remote database, for example via a Wi-Fi, 4G, 5G, etc., communications network.

Very advantageously, a ratio between the total number of pairs of false matches ($B_T$, $B_R$) and the total number of matching queries is chosen equal to a predetermined false acceptance rate FAR. The false acceptance rate FAR can be adjusted by modifying the parameters of the identification function f (in particular its validation threshold T) before performing the bias evaluation.

By selecting the same false acceptance rate FAR for several identification functions to be compared, it is ensured that the comparison is relevant.

In this case, the selected false acceptance rate FAR is advantageously greater than 0.50%, more preferably greater than 1.0% and less than 20%. The FAR rate is advantageously taken to be 10%, or taken to be equal to 1.0%.

It will be understood that the evaluation of the bias associated with the Doddington risk can be carried out for the same identification function f, according to several different FAR rates.

From the pairs of false matches ($B_T$, $B_R$) obtained, "Wolf Counts" and/or "Lamb Counts" associated with the prints appearing at least once among the pairs of false matches are then determined in a step 300.

The Wolf Count $WC(B_T)$ of a candidate print $B_T$ represents the number of occurrences of said candidate print $B_T$ among the pairs of false matches, that is, the number of times that said candidate print $B_T$ is erroneously considered to match with the same individual as a reference print $B_R$ by applying the identification function f.

The Lamb Count $LC(B_R)$ of a reference print $B_R$ represents the number of occurrences of said reference print $B_R$ among the pairs of false matches, that is, the number of times that said reference print $B_R$ is erroneously considered to match with the same individual as a candidate print $B_T$ by applying the identification function f.

The bias associated with the identification function f can be determined from either the Wolf Counts or Lamb Counts viewpoint, or preferably from both viewpoints. In the example described below, the Wolf Counts as well as the Lamb Counts are considered.

More specifically, in step 300, the number $WC(B_T)$ is counted for each candidate print $B_T$ included in at least one of the pairs of false matches ($B_T$, $B_R$), and/or the number $LC(B_R)$ is counted for each reference print $B_R$ included in at least one of the pairs of false matches ($B_T$, $B_R$).

FIGS. 2A to 2d depict graphically counting results obtained at the end of step 300, for an initial biometric identification function f and for an enhanced biometric identification function f*.

In FIGS. 2A to 2d, the candidate and reference prints (index i_BT for the candidate prints $B_T$, and index i_BR for the reference prints $B_R$) have been indexed on the abscissa axis in descending order of Lamb Count or Wolf Count. In other words, the candidate or reference prints associated with a maximum number of pairs of false matches appear on the left.

Figure 2A:
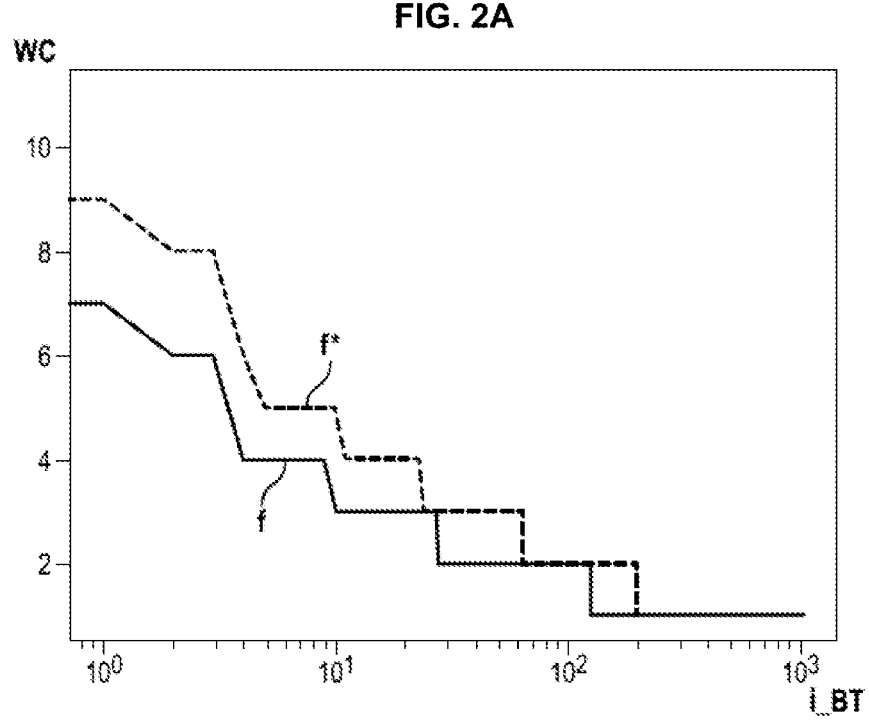
FIG. 2A graphically depicts a number of pairs of false matches (on the ordinate axis) obtained with two identification functions, for candidate prints from a database of candidate prints arranged (on the abscissa axis, on the logarithmic scale) in descending order of the number of pairs of associated false matches. The rate of false acceptances here is 10%.

FIG. 2A shows the Wolf Counts $WC(B_T)$ in descending order for the candidate prints $B_T$, with a false acceptance rate FAR equal to 10%.

Figure 2B:
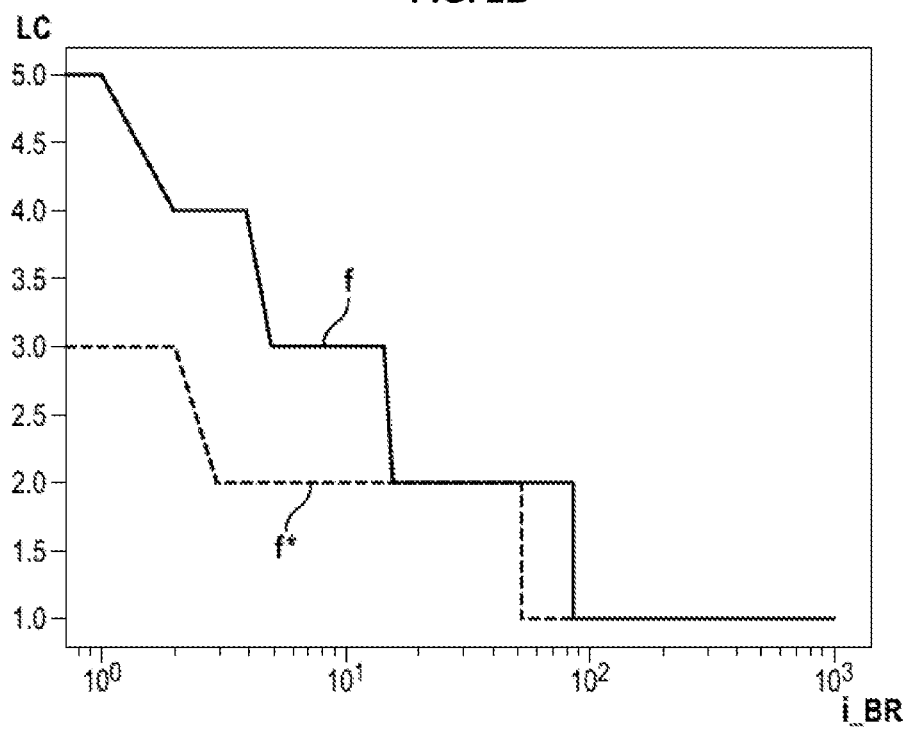
FIG. 2B graphically depicts a number of pairs of false matches (on the ordinate axis) obtained with two identification functions, for reference prints from a database of reference prints arranged (on the abscissa axis, on the logarithmic scale) in descending order of the number of pairs of associated false matches. The rate of false acceptances here is 10%.

FIG. 2B shows the Lamb Counts ($B_R$) in descending order for the reference prints $B_R$, with a false acceptance rate FAR equal to 10%.

Figure 2C:
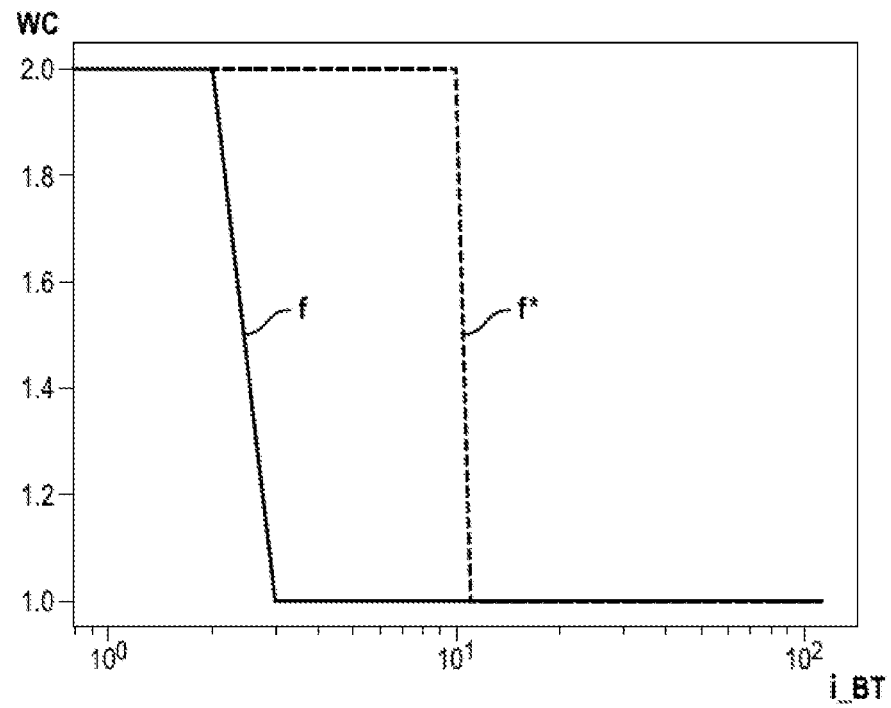
FIG. 2C graphically depicts a number of pairs of false matches (on the ordinate axis) obtained with two identification functions, for candidate prints from a database of candidate prints arranged (on the abscissa axis, on the logarithmic scale) in descending order of the number of pairs of associated false matches. The rate of false acceptances here is 1%.

FIG. 2C shows the Wolf Counts $WC(B_T)$ in descending order for the candidate prints $B_T$, with a false acceptance rate FAR equal to 1.0%.

Figure 2D:
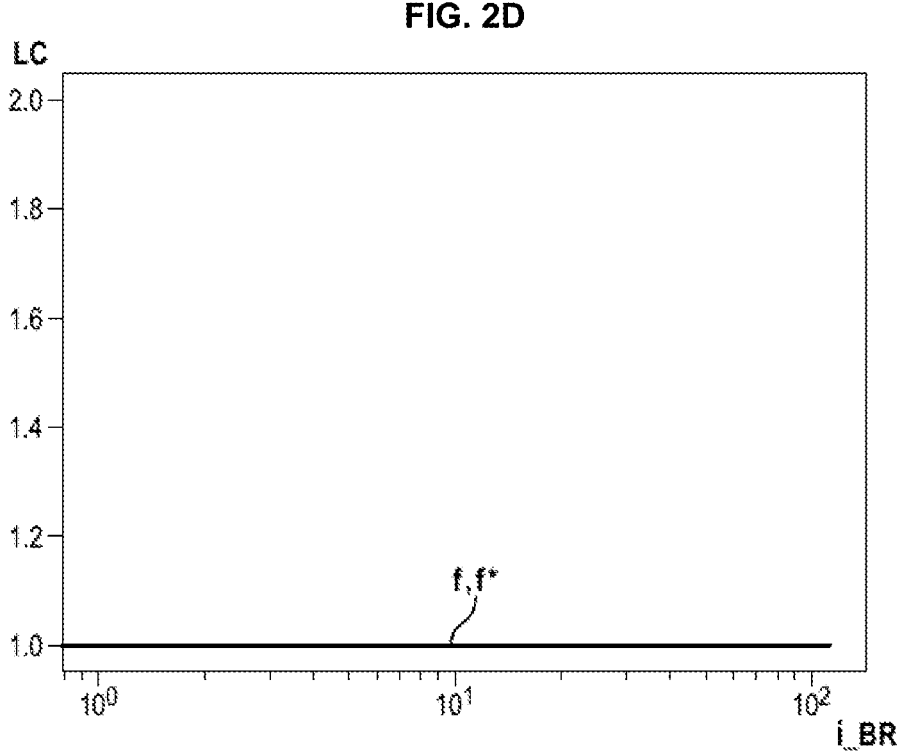
FIG. 2D graphically depicts a number of pairs of false matches (on the ordinate axis) obtained with two identification functions, for reference prints from a database of reference prints arranged (on the abscissa axis, on the logarithmic scale) in descending order of the number of pairs of associated false matches. The rate of false acceptances here is 1%.

FIG. 2d shows the Lamb Counts $LC(B_R)$ in descending order for the reference prints $B_R$, with a false acceptance rate FAR equal to 1.0%—as regards this FIG. 2d, it is noted that all the reference prints $B_R$ considered are associated with a single pair of false matches for the two functions f and f*.

From the counting results obtained in step 300, the bias score S associated with the biometric identification function f is then calculated in a step 400. The bias score S depends on the Wolf Counts and/or Lamb Counts.

More specifically, the bias score S is calculated either based on a maximum WCM of the Wolf Counts, or based on a maximum LCM of the Lamb Counts, or (as in the present example) based on these two maxima WCM and LCM.

As indicated above, a high bias score S corresponds to an identification function f considered highly biased from the Doddington risk point of view, since it often reveals the same candidate print or the same reference print in false acceptances. Conversely, the lower the bias score S, the more satisfactory the identification function f is considered from the Doddington risk point of view.

An identification function considered optimal and unbiased, for a given FAR rate, would therefore be a function for which all Lamb Counts and all Wolf Counts are equal to 1. In other words, no candidate or reference print appears more than once in the pairs of false matches ($B_T$, $B_R$).

In the present example, the bias score S is calculated based on the maximum Wolf Count $WC(B_T)$ at 10% FAR and based on the maximum Lamb Count $LC(B_R)$ at 10% FAR.

With respect to FIG. 2A, the maximum WCM= $WC(B_T)_{max}$ for the function is equal to 8 and the maximum WCM for the function f is equal to 7. Additionally, with respect to FIG. 2B, the maximum LCM=$LC(B_R)_{max}$ for function f* is equal to 3 and the maximum LCM for function f is equal to 5.

Considering for each of the identification functions a bias score S, with S=WCM+LCM, a bias score equal to 11 is obtained for the function f*, and a bias score equal to 12 for the function f.

In addition, the functions f and f* have the same maximum Wolf Counts equal to 2 (intercepts in FIG. 2C) and also have the same maximum Lamb Counts equal to 1 (intercepts in FIG. 2d). These values could be taken into account in the calculated bias score S.

For the construction of an alternative bias score associated with the Doddington risk for the identification functions, the maximum WCM of the Wolf Counts, on the one hand, and the maximum LCM of the Lamb Counts, on the other hand, could be assigned separate multiplier coefficients. For example, it is possible to give greater weight to the Lamb Counts, in order to consider the identification function to be highly biased if the same reference print from the UL database is frequently returned in the pairs of false matches.

Alternatively, several consecutive maxima could also be considered. For example, here, with respect to FIG. 2B, the sum of the three maxima LC($B_R$) for the function f is equal to 13, and the sum of the three maxima LC($B_R$) for the function f* is equal to 8.

It should also be noted that the bias score S could depend on metrics relating to Wolf Counts and/or Lamb Counts other than the maxima referred to above. The area between the curve of the Wolf Counts and/or Lamb Counts ordered in descending order and the curve y=1 may also be a relevant metric.

Here, at the end of step 400, a comparison is made between the bias scores calculated for the two biometric identification functions f and f*. It will be understood that it is also possible to carry out the bias evaluation only for a given identification function, or else for a plurality of variations of the same function among which it is desired to identify the least biased function.

It is thus determined that the function f* is less biased than the function f from the point of view of Doddington risks. The function f* is thus more practical to use than the function f, for example to determine whether an acquired candidate print is present in a reference latent print UL database, as will be seen below.

If necessary, the determination of the bias score (and the comparison of the biases of several functions, if applicable) can be carried out several times, considering several different databases of reference prints and/or candidate prints.

The evaluation of the bias of function f with respect to Doddington's risk may be part of a more general evaluation of the quality of function f.

Referring back to the evaluation method 10, at an optional step 500, a performance score P associated with the function f is determined. This performance score P is calculated independently of the bias score S. It will be understood that step 500 can be implemented in parallel with the determination of the bias score S, or at the same time as any one of steps 100 to 400.

Optionally and advantageously, the performance score P of the function f is calculated as a function of the FRR rate of false rejections and/or FAR rate of false acceptances of the function f, and/or depends on the stability of the rate of false acceptances (and/or false rejections) with respect to several discrete learning databases.

Figures 3, 4:
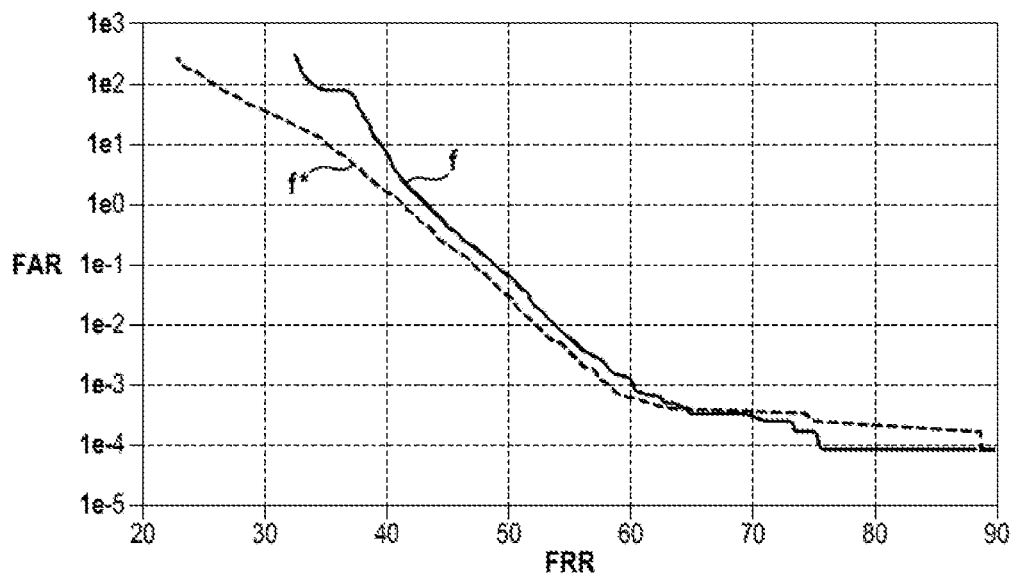
FIG. 3 is a comparative graph of the performance of two identification functions, illustrating the rates of false rejections (on ordinate axis) obtained according to the two identification functions, based on the rates of false acceptances (on abscissa axis) arranged in ascending order.
FIG. 4 is a table relating to the stability of a series of identification functions with respect to the rate of false acceptances. The table compares the false acceptance rates obtained for three candidate and reference print databases, for a plurality of validation thresholds.

FIG. 3 shows false rejection rates (on the ordinate axis) obtained with the enhanced function f* and the function f, as a function of the false acceptance rate. FAR rates of false acceptances are arranged (on the abscissa axis) in ascending order. The different FAR rates of false acceptances are typically associated with different validation thresholds T for the enhanced function f* and the function f.

Conventionally, the FRR rate of "false rejections" is equal to the ratio between, on the one hand, the total number of candidate print/reference print pairs giving a false-negative matching result R (for prints related to the same individual), and, on the other hand, the total number of pairs having a negative result.

Here, for each identification function, the smaller the area under the curve of the FRR rates based on the FAR rates, the more effective the function is considered to be. Indeed, a high-performance function must not erroneously provide negative identification results. The performance score P can therefore, for example, depend on the opposite of the area under the curve, or on the opposite of a false rejection rate FRR obtained for a specific false acceptance rate value.

In the example of FIG. 3, the enhanced function f* is clearly more effective than the function f; in particular, for a false acceptance rate FAR equal to 1.0%, it can be seen that the false rejection rates FRR obtained are respectively about 41% for the enhanced function f* and about 43% for the function f.

FIG. 4 is a table of variance data of the false acceptance rate FAR for the same identification function f and for different validation thresholds T, based on various reference print and candidate print databases considered.

The first row, the second row and the third row of the variance table of FAR rates of FIG. 4 correspond respectively to a first database TPUL1, a second database TPUL2 and a third database TPUL3 of reference prints and candidate prints. The columns correspond to different validation thresholds T above which the match result R between two prints is considered positive. The validation thresholds are ordered in ascending order, from left to right of the table.

It is recalled that the reference prints and the candidate prints used for the evaluation are labelled, which makes it possible to determine the candidate print/reference print pairs corresponding to false rejections or false acceptances.

In the present example, the expected false acceptance rate FAR is 1.0% for a validation threshold T equal to 2500.00. It can be seen that the FAR rates obtained with the three databases vary little, between 0.86% and 1.42%.

The last row of the table gives the standard deviation σ between the three false acceptance rates, specific to each validation threshold value T. For example, for a validation threshold T equal to 2500.00, the standard deviation between the FAR rates is 0.28.

It will be understood that the smaller the standard deviation, the more stable the function f is considered for false acceptances. The performance score P may therefore, for example, depend on the opposite of the standard deviation σ.

It is advantageous to ensure that the identification function f is stable from the point of view of false acceptances, in order to be able to use the same validation threshold T whatever the UL database of latent prints considered, while maintaining control over the rate of false acceptances. Stability against false rejections could also be evaluated.

The performance score P thus obtained, associated with the bias score S, can make it possible to select or develop a biometric identification function having a lower bias with respect to the Doddington risk, and also having good performance in terms of minimizing false rejections and/or stability of false acceptances.

Referring back to the evaluation method 10, in an optional step 600, the bias score S is compared with a bias threshold $S_{max}$. For example, the biometric identification function f is evaluated as sufficiently little biased from the point of view of Doddington risks if and only if $S \leq S_{max}$. The bias threshold depends on the chosen metrics.

It would be possible to compare the performance score P to a threshold, or to create a composite score from the bias and performance scores and to compare said composite score to another threshold.

If $S > S_{max}$, it can be determined that a further enhancement of the biometric identification function f is necessary, in order to obtain a function which is less biased from the point of view of Doddington risks and/or more efficient.

The enhanced biometric identification function may be generated by fusion of algorithms and/or by isotropization and/or by convolutional neural network (CNN) optimization, according to embodiments known to those skilled in the art.

Biometric Identification System

Figure 5:
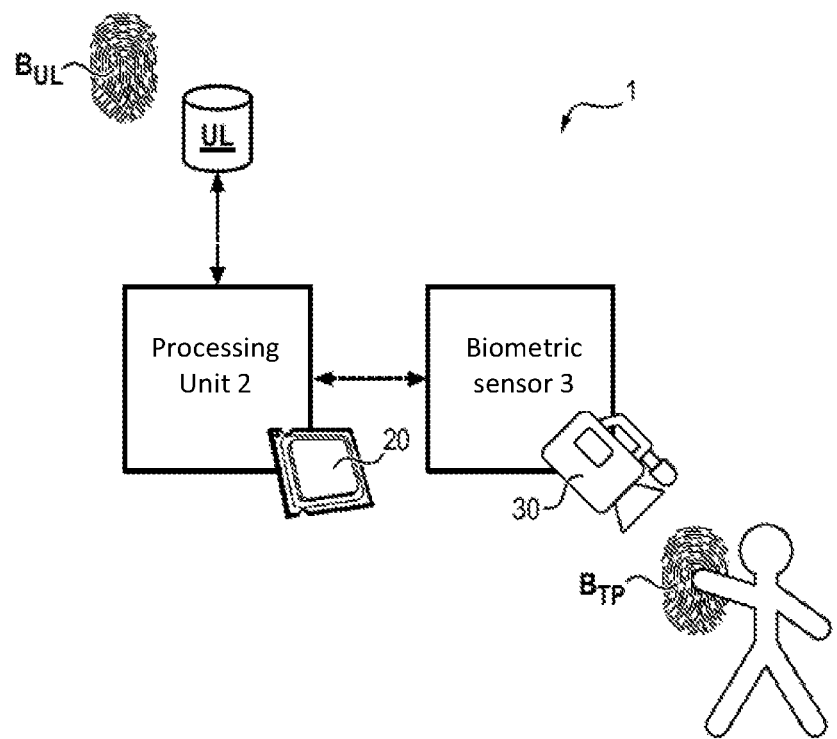
FIG. 5 schematically depicts a system for biometric identification according to one embodiment.

FIG. 5 shows schematically a biometric identification system 1 according to an exemplary embodiment.

The biometric identification system 1 is configured to implement biometric identification of an acquired print $B_{TP}$, with respect to at least one reference biometric print $B_{UL}$ (and, preferably, with respect to a UL database comprising a large number of reference prints $B_{UL}$).

The reference biometric print $B_{UL}$ is an unidentified data item, that is, that there is no identity data reliably associated with an individual from whom the reference biometric print $B_{UL}$ is derived. Preferably, the unidentified reference biometric data $B_{UL}$ is derived from a UL database of unidentified latent prints. This UL database has been created, for example, by the police forces.

The UL database preferably comprises a large number of reference prints, for example more than 10,000 reference prints, preferably more than 1,000,000 reference prints. The reference prints (hereinafter denoted $B_{UL}$) are preferably not labelled latent prints, that is, not associated with an identity of an individual. As has been indicated above, latent prints are typically prints that have low visibility, since they may differ slightly from the background. These latent prints have typically not been acquired in a controlled manner.

The system 1 comprises, in particular, a processing unit 2. The processing unit 2 is typically a processor or a set of processors comprised in a server. The processing unit 2 has access to the UL database, either wirelessly or via a wireless communication network, for example a Wi-Fi, 4G, 5G, Bluetooth, etc., network. The communication is preferably rendered secure. It is possible that the biometric identification is carried out in a shared manner, between several possibly remote servers sharing access to the UL database.

Alternatively, the processing unit 2 may be comprised in a secure element, for example, in a "smart card" secure chip.

The processing unit 2 has data storage means 20 on which code instructions for implementing the biometric identification method are loaded, typically a disk or a memory. The data storage means 20 store in particular computer code for the execution of the biometric identification function f*.

The system 1 also comprises a biometric sensor 3, configured to acquire the acquired print $B_{TP}$ and to communicate said print to the processing unit 2. In the present example, the biometric sensor 3 comprises a finger positioning zone (not illustrated) and further comprises an imaging device 30 for acquiring images of a finger placed on the finger positioning zone. The imaging device 30 is preferably a Ten Print scanner.

It will be understood that the acquired biometric data $B_{TP}$ and the reference biometric data $B_{UL}$ could not be prints, but rather data of another type such as, for example, facial images, extracts of individuals' voices, palmar images, retinal images, etc. The type of biometric sensor 3 is then adapted based on the type of biometric data necessary for biometric identification.

Unlike the latent prints $B_{UL}$, the acquired print $B_{TP}$ is preferably acquired in a controlled manner using the biometric sensor 3, for example from a suspect who has previously been apprehended. As a result, the print acquired $B_{TP}$ generally benefits from very good visibility conditions. This may be a "Ten Print" type print. Alternatively, the acquired print $B_{TP}$ is a latent print, for example obtained at a crime scene.

The processing unit 2 and the biometric sensor 3 may be integrated into the same device, or they may be connected by a wired or wireless link.

The processing unit 2 is configured to execute, in association with the biometric sensor 3, a biometric identification, for example, according to the method described below in relation to FIG. 6.

Advantageously, the processing unit 2 also makes it possible to implement the above method 10 for evaluating the bias, with the aid of access to the UL* database and to the TP database, which gather candidate and reference prints labelled for the evaluation of bias.

Thus, the function f* used for biometric identification may have been obtained after one or more selections, combinations, isotropizations, etc., following one or more evaluations as described above of the bias related to the "Doddington risks."

Biometric Identification Method

Figure 6:
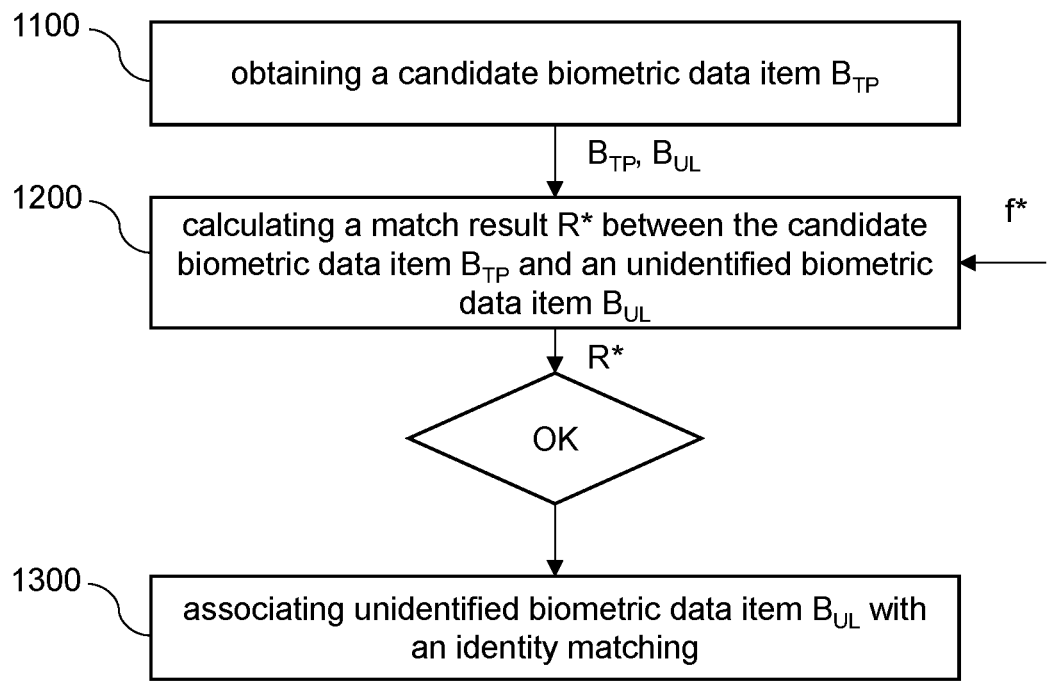
FIG. 6 shows the steps of a method of biometric identification according to one example, said method being able to be implemented by the system of FIG. 5.

FIG. 6 shows a biometric identification method 50 according to one example. The method 50 is, for example, implemented by the system 1. The biometric identification here comprises the search for a candidate print $B_{TP}$, which can also be referred to as a "query", in a UL database of reference prints $B_{UL}$, which are "latent" prints not yet assigned to individuals.

In a step 1100, the acquired Print $B_{TP}$ is obtained, for example, with the aid of the biometric sensor 3. Alternatively, this candidate print is retrieved from memory or from a database of candidate prints.

It should be recalled that, if an identity of the individual from whom the acquired print $B_{TP}$ is obtained is known, it is possible to establish, by means of the biometric identification, whether or not said individual is present among the reference prints stored in the UL database.

To do this, in a step 1200, the acquired print $B_{TP}$ is compared with at least one reference print $B_{UL}$ among the reference prints of the UL database. Preferably, the acquired print $B_{TP}$ is compared with each of the reference prints present in the UL database. The comparison is carried out with the aid of the biometric identification function f*, taking as input the acquired print $B_{TP}$ and the reference print $B_{UL}$, and returning as output a positive or negative match result R*.

If the match result R* is positive (greater than or equal to the validation threshold associated with the identification function f*), it is determined at a step 1300 that the acquired print $B_{TP}$ is a potential candidate to belong to the same individual as the reference print $B_{UL}$. It will be understood that if several latent prints have given a positive match result, all these latent prints are considered potential candidates.

Preferably, at this stage, a human examiner takes over. The latter carries out a thorough examination of the acquired print $B_{TP}$ and of the reference print $B_{UL}$ in order to establish visually whether these prints in fact belong to the same individual.

Alternatively, potential candidates are subjected to other tests, possibly to other identification algorithms, to corroborate or not the results.

If no reference print $B_{UL}$ present in the UL database is sufficiently close to the acquired print $B_{TP}$ according to the biometric identification results, this acquired print $B_{TP}$ will not be subject to verification by a human examiner. It is preferably considered that this acquired print $B_{TP}$ does not appear in the UL database.

By evaluating the bias associated with the Doddington risk, it has been ensured that the biometric identification function does not frequently returns false acceptances for the same acquired print $B_{TP}$, or for the same latent print $B_{UL}$ of the UL database.

Thus, it is avoided that the human examiner is invited to carry out too many advanced examinations with respect to the same print after the automated biometric identification described above.

The invention claimed is:

1. A data processing method comprising:
evaluating a biometric identification function from a candidate biometric data set comprising candidate biometric data items and from a reference biometric data set comprising reference biometric data items,
the candidate biometric data items and the reference biometric data items being of the same type and each being associated with a known individual,
the biometric identification function, applied to any of the candidate biometric data items and any of the reference biometric data items, returning a matching result from said two data items, wherein evaluating the biometric identification function comprising:
obtaining pairs of false matches, each pair comprising one of the candidate biometric data items and one of the reference biometric data items not associated with a same known individual, and whose matching result is greater than or equal to a predetermined threshold,
determining at least one of:
first numbers, wherein each of the first numbers is associated with a candidate biometric data item among the candidate biometric data items—comprised in at least one of the pairs of false matches and is equal to the number of pairs of false matches obtained comprising said candidate biometric data item,
second numbers, wherein each of the second numbers is associated with a reference biometric data item among the reference biometric data items comprised in at least one of the pairs of false matches and is equal to the number of pairs of false matches obtained comprising said reference biometric data item,
calculating a bias score associated with the biometric identification function, the bias score being calculated based on at least one of: a maximum of the first numbers, a maximum of the second numbers,
obtaining an enhanced biometric identification function from the biometric identification function, such that an enhanced bias score obtained for the enhanced biometric identification function is lower than the bias score obtained for the biometric identification function,
identifying at least one unidentified biometric data item on the basis of the enhanced biometric identification function, wherein identifying the at least one unidentified biometric data item comprises:
obtaining a candidate biometric data item, the obtained candidate biometric data item being of the same type as the unidentified biometric data item,
calculating at least one match result between the obtained candidate biometric data item and the unidentified biometric data item,
if the match result is greater than or equal to a threshold, associating the unidentified biometric data item with an identity matching with the obtained candidate biometric data item.

2. The data processing method according to claim 1, wherein the bias score is equal to one of:
the maximum of the first numbers;
the maximum of the second numbers; and
a sum of the maximum of the first numbers associated with a candidate biometric data item affected by a first coefficient and the maximum of the second numbers affected by a second coefficient.

3. The data processing method according to claim 1, wherein the reference biometric data set is derived from a training latent print database.

4. The data processing method according to claim 3, wherein the candidate biometric data set comprises first candidate biometric data items associated each with a known individual present in the training latent print database, and further comprises second candidate biometric data items associated each with a known individual absent from the training latent print database.

5. The data processing method according to claim 1, wherein the candidate biometric data items and the reference biometric data items are derived from fingerprints, or are derived from iris images, or are derived from face images, or are derived from extracts from the voices of individuals.

6. The data processing method according to claim 1, wherein the predetermined threshold for the matching result is selected so that a ratio between a total number of pairs of false matches and a total number of matching queries is equal to a predetermined false acceptance rate, wherein the matching queries are pairs of matches comprising one of the candidate biometric data items and one of the reference biometric data items whose matching result provided by the biometric function is greater than or equal to the predetermined threshold.

7. The data processing method according to claim 6, wherein the rate of false acceptances is greater than 0.50%, more preferably greater than 1.0% and less than 20%, even more preferably equal to 10%.

8. The data processing method according to claim 6, comprising a step of determining a performance score associated with the biometric identification function,
wherein the performance score depends on the false acceptance rate and further depends from a false rejection rate of the biometric identification function.

9. The data processing method according to claim 1, comprising a step of evaluating the bias score with respect to a bias threshold, the biometric identification function being evaluated as having sufficient little bias if the bias score is less than or equal to the bias threshold.

10. The data processing method according to claim 1, comprising an additional step of comparing the bias score obtained for the biometric identification function and an additional bias score obtained for an additional biometric identification function.

11. The data processing method according to claim 1, comprising an additional step of obtaining an enhanced biometric identification function from the biometric identification function,
such that an enhanced bias score obtained for the enhanced biometric identification function is lower than the bias score obtained for the biometric identification function.

12. A system for biometrically identifying an individual, comprising:
a processing unit configured to implement a data processing method according to claim 1, from the acquired candidate biometric data item and from a set of unidentified biometric data,
a biometric sensor configured to acquire a candidate biometric data item.

13. A non-transitory computer program product on which code instructions are stored, which, when said instructions are executed by a computer, cause the computer to execute an evaluation method according to claim 1.

* * * * *